Figure 1:
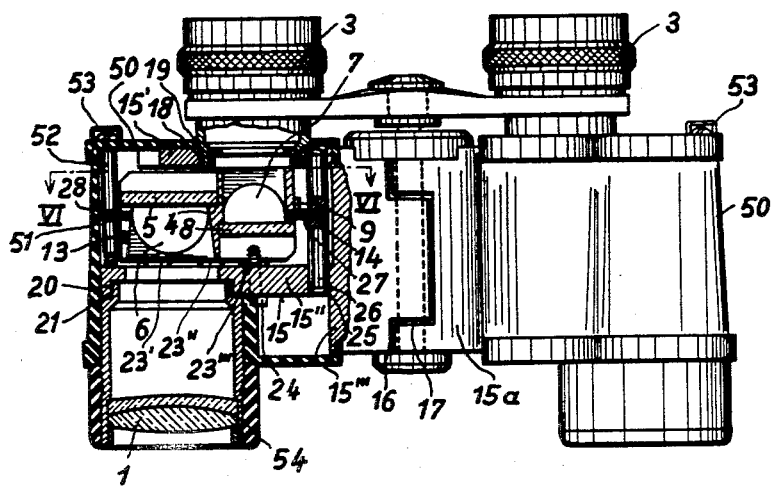

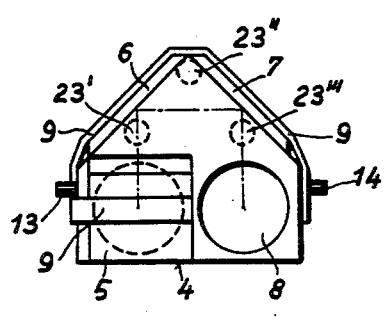
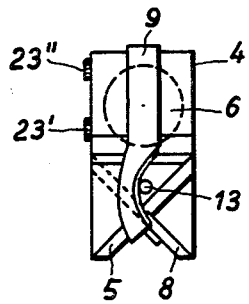
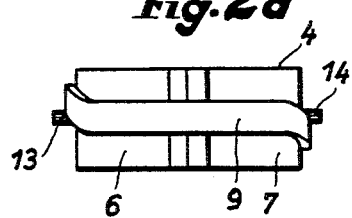
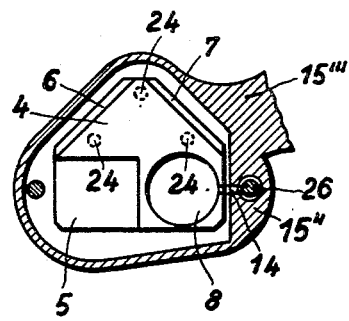
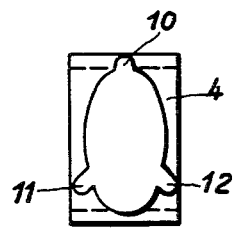

2,940,359
Patented June 14, 1960

2,940,359

MIRROR BINOCULAR

Kurt Räntsch, Wetzlar, Germany, assignor to M. Hensoldt & Sohne, Optische Werke A.G., Wetzlar, Germany Filed June 30, 1958, Ser. No. 745,773

11 Claims. (Cl. 88—33)

The invention is based on a binocular where in a familiar manner a mirror carrier, in the form of a Porro prism of the second type, made of metal or the like, is provided, which has borings for the passing of light and on which carrier plane mirrors are placed. Mirrors and mirror carriers replace the Porro prisms usually arranged in the binoculars.

The advantage of mirrors supported in such manner contrary to glass Porro prisms is that the surface- and angle-conditions are easy and very accurately met in production in that the metal bodies with the correct plane angles and the plane mirrors separately can be manufactured with great plane quality. In contrast thereto, care had to be taken in the former production of Porro prisms that the surface and angle-conditions are met simultaneously. This was not or very hardly possible because if an angle-correction was made, the mirror surface suffered. If on the other hand, the mirror surface was reworked, the angle usually suffered. The binocular on which the invention is based, is therefore easier to manufacture technically than one having glass Porro prisms, and is therefore much cheaper.

It is an object of the invention to make the production of such a binocular even cheaper by creating a better possibility for adjustment than before.

Up to now the prisms were inserted in supports provided in the binocular housing. It was difficult to make the support so that the prisms were positioned correctly to the objectives and eyepieces. Therefore, the eyepieces and objectives were usually adjusted once more after inserting the prisms. This was complicated and made the binoculars considerably more expensive. For other binoculars there were possibilities to displace the Porro prisms in one direction vertical to the optical axis. This adjustment was not satisfactory either because the control for displacement of the prisms on the one hand was part of the housing and thus was difficult to place into the correct position to the optical axes and on the other hand because only displacement in one direction was possible.

According to this invention the disadvantages of the known adjusting device are avoided in providing two supports which are hinged together, each support having two plates, said plates being fixedly connected one with another and forming a space between them, one of said plates lying perpendicular to the optical axis of said oculars and objectives, one of said mirror carriers being arranged in the space of each support so as to be adjacent to said plane surface of said support, said mirror carriers being shiftable along said plane surfaces of said plates of said supports to adjust the binocular, means to connect said mirror carriers with said plates having said plane surfaces, each plate having a boring, said oculars and said objectives being fixed to said borings. If the eye-pieces can be displaced in the direction of the optical axis then the corresponding borings take the control sleeve for the eyepieces.

The advantage of the design improvement according to the invention will be realized if one considers that borings in the plates can be made very accurately and thus are easily arranged vertical to the control surfaces so that from the beginning the position of the optical axis of the eyepieces and objectives is established. Since also the mirror carriers can be displaced along the plane surface in any direction, the mirrors can easily be brought into the proper position between the now established optical axis. Supports provided in this manner therefore allow extremely simple and reliable adjustment without requiring great expenditure in respect to design.

Another feature of the invention is that they are hinged together. For this purpose the supports have one more borings for the buckling axis. These borings again can be made very accurately vertical to the plane surface so that even the buckling axis is always adjusted and thus special means as, e.g. the formerly used eccentrics are no longer necessary in the buckling axis of the binoculars.

Every carrier has an advantageously three-point-contact with the appropriate plane surface. The fastening of the carrier on the support after adjustment advantageously is performed by using clamping screws which engage in the points of contact of the carrier.

The auxiliary means for the displacement of the carrier on the control surfaces can be varied, especially another boring can be provided in every support parallel to the optical axis of the objectives and eyepieces. In this boring should be a pivot which, in turn, has a boring vertical to its axis in which boring a displaceable pin is situated which is connected with the mirror carrier. This improvement guarantees displacements and rotations of the mirror carrier in a plane parallel to the control surface.

On the opposite side of the mirror carrier advantageously a recess is provided in which a pin can be put for adjustment. Instead of such a recess also an adjusting pin can be provided which, however, then remains with the carrier after adjustment.

Support and mirror carrier advantageously are connected with each other by an eccentric so that by turning that eccentric, movements of the mirror carrier along the control surface are made possible.

In another form of construction the support and mirror carrier are connected with each other by two pivots.

The mirrors lying on the mirror carriers should have three tongues so that every mirror lies on the carrier with a three-point contact. Since a mirror coating is necessary only as far as the borings let light impinge on the mirrors, the tongues can be extensions of the mirror coating.

The mirrors themselves advantageously are held on the mirror carrier by an elastic band. This possibility once results from the shape of the mirror carrier according to a Porro system of the second type. On the other hand it is also given by the fact that the mirrors, when the mirror carrier is inserted in the telescope, can no longer fall off the mirror carrier because all components are in one housing.

If the two adjusting pins are arranged on the mirror carrier, as described above, the elastic band can be placed around these pins in order to give said carrier a secure position.

Two systems "Mirror Carrier with Mirror" and "Support with Inserted Eyepieces and Objectives" connected with each other through the buckling axes, constitute already a complete double telescope. In contrast to former times where the housing itself was designed as support for the prisms or mirrors or the like, the housing now serves only to improve the appearance of the device and to protect it against dust and humidity.

This entails another simplification of such binoculars: the housing can now advantageously consist of two parts which can be composed and which hold the supports for the mirror carriers and rest on said supports. Housing and supports are advantageously connected by screws and screw rings. The screw heads directed toward the eyepieces can simultaneously serve as ears for the carrying strap.

Figure 3:
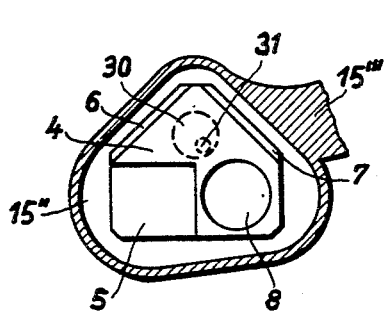
Figure 4:
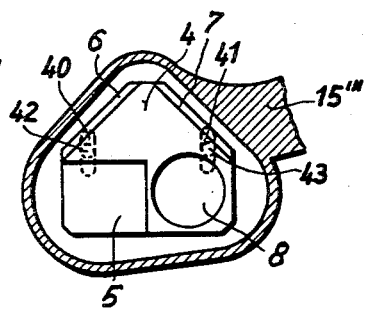

In the accompanying drawing are shown embodiments of a binocular and its parts according to this invention. The figures show:

Fig. 1—partial section through a binocular,
Fig. 2a—a mirror carrier of Fig. 1, view,
Fig. 2b—a mirror carrier of Fig. 2a, plan view,
Fig. 2c—a mirror carrier of Fig. 2b, side view,
Fig. 3 shows a mirror carrier in connection with the support by an eccentric,
Fig. 4 shows the connection of a mirror carrier with the support by two pivots,
Fig. 5 shows a mirror.
Fig. 6 shows a section along the line VI—VI of Fig. 1.

It can be gathered from Figs. 1 and 6 that the light rays passing through an objective 1 impinge on a Porro-mirror system 4 of the second type. There they are deflected and leave that system in the direction toward eyepiece 3. The Porro system consists of four mirrors 5, 6, 7 and 8 arranged on a bored-through metal support 4 (Figs. 2a–2c). The light beams impinge on these mirrors in this sequence. The mirrors are held on the carrier 4 by a rubber band 9. Every one of the mirrors has three tongues, 10, 11, and 12, with which it rests on the mirror carrier 4 in three points (Fig. 5). The mirror carrier in Figs. 2a–c has further two pins, 13 and 14. The rubber band 9 is placed around these pins in the manner shown in the figures to obtain a better hold. It can be seen from Fig. 1 that the mirror 4 rests between two plates 15' and 15" of a support 15. The plates 15' and 15" are spaced by a body 15'''. The body 15''' has a boring 16, in which a shaft 17 is placed. The shaft 17 connects support 15 with a corresponding support 15a and thus serves as buckling axis for the binocular.

In a threaded boring 18 of plate 15' the guide bearing for the eyepiece 3 is screwed. The guide bearing 18 is in contact with an adjusted contact surface 19. The objective tube 1 is screwed into another boring 20 of plate 15". This tube too is in contact with an adjusted contact surface 21. The borings 16, 18 and 20 are adjusted exactly vertical to a plane surface 22 of the plates 15". The carrier 4 is in contact with this surface 22 with three points 23', 23", 23''' and is kept toward the support by screws 24 engaging in the points 23', 23", 23'''.

After loosening the screws 24, the carrier 4 can be adjusted in the support 15, along the surface 22 for adjusting purposes. In order to render such movement possible, a pivot 26 is arranged in a boring 25 of the body 15'''; the pivot 26 in turn, has a boring 27 in which the pin 14 of the mirror carrier 4 can be displaced. The mirror carrier 4 can thus move about the axis of pivot 26 and radial to that axis. The movement can be initiated by a pin which can be placed in a recess 28, but the movement can also be effected from the pin 13.

In Fig. 3 another form of construction for adjusting the mirror carrier 4 is shown. The plate 15" has a rotary ring 30 in which, eccentrically a pin 31, connected with the mirror carrier 4 engages by turning the ring 30; the necessary adjusting movements are given to the mirror carrier 4.

In Fig. 4 another adjusting means is shown. The plate 15" has two slits, 40 and 41, in which two pins, 42 and 43, of the mirror support 4 engage. It can be seen that the mirror carrier 4 is pivoted either around the pin 43 or in the pin 42, so that here too the necessary adjusting movements can be given to the mirror carrier. After adjustment the screws 24 are tightened and the mirror carrier sits fixedly in the support 15.

The supports 15 and 15a with the inserted Porro system as well as the screwed-in eyepieces 3 and objectives 1 are complete telescopes. A housing is placed around the supports 15 and 15a and this housing consists of two parts 50 and 51. The parts 50 and 51 rest on the plate 15'. The part 50 is fastened to that plate by means of a screw 52. The screw head 53 of that screw simultaneously serves as an ear for the carrying strap. The housing part 51 is fastened on the plate 15" and body 15''' by means of a screw ring 54.

I claim:

1. A binocular having two oculars and two objectives as well as two mirror carriers in the form of Porro prisms of the second type, each carrier having borings for the light passage and the mirrors being fastened on said carriers, two supports being hinged together, each support having two plates, said plates being fixedly connected one with another and forming a space between them, one of said plates of each support having a plane surface lying perpendicular to the optical axis of said oculars and objectives, one of said mirror carriers being arranged in the space of each support so as to be adjacent to said plane surface of said support, said mirror carriers being shiftable along said plane surfaces of said plates of said supports to adjust the binocular, means to connect said mirror carriers with said plates having said plane surfaces, each plate having a boring, said oculars and said objectives being fixed to said borings.

2. A binocular according to claim 1, each of said carriers having three-points with which it rests on said appropriate plane surface.

3. A binocular according to claim 1, each of said supports having another boring parallel to the optical axes of the oculars and objectives, a pivot arranged in said boring, said pivot comprising a boring directed vertically to its axis, a pin connected with said mirror carrier and arranged slidably in said boring of said pivot.

4. A binocular according to claim 1, each of said supports having another boring parallel to the optical axes of the oculars and objectives, a pivot arranged in said boring, said pivot comprising a boring directed vertically to its axis, a pin connected with said mirror carrier and arranged slidably in said boring of said pivot, said mirror carrier having a recess on the side opposite to said pin, said recess being adapted to receive a further pin for the adjustment of said mirror carrier.

5. A binocular according to claim 1, each of said supports having another boring parallel to the optical axes of the oculars and objectives, a pivot arranged in said boring, said pivot comprising a boring directed vertically to its axis, a pin connected with said mirror carrier and arranged slidably in said boring of said pivot, said mirror carrier having a further pin on the side opposite said pin slidably in said boring, said further pin being simultaneously used as a holding pin for an elastic band holding said mirrors and said carriers.

6. A binocular according to claim 1, said means connecting said carriers and their supports being screws.

7. A binocular according to claim 1, said means connecting said carriers and said plates having said plane surfaces being eccentrics.

8. A binocular according to claim 1, said means connecting said carriers and said plates having said plane surfaces being two pivots for each support.

9. A binocular according to claim 1, said mirrors having three tongues with which they rest on the carriers.

10. A binocular according to claim 1, said mirrors having three tongues with which they rest on the carriers, said tongues being extensions of the mirror coating.

11. A binocular according to claim 1, having a housing surrounding said supports and being supported by said supports, said housing consisting of upper parts and lower parts, screws attaching said upper parts of said housing to said supports, the heads of said screws having holes serving as ears for a carrying strap, rings being adapted to pull the lower parts of said housing toward the supports.

References Cited in the file of this patent

UNITED STATES PATENTS

| | | |
|---|---|---|
| 1,009,259 | Picard | Nov. 21, 1911 |
| 1,533,248 | Harwix | Apr. 14, 1925 |
| 2,079,890 | Wollensak et al. | May 11, 1937 |
| 2,359,609 | Bausch | Oct. 3, 1944 |
| 2,378,396 | Fassin | June 19, 1945 |

FOREIGN PATENTS

| | | |
|---|---|---|
| 141,961 | Great Britain | Apr. 29, 1920 |
| 449,552 | Great Britain | June 29, 1936 |
| 586,906 | Great Britain | Apr. 3, 1947 |
| 345,408 | Germany | Dec. 21, 1921 |
| 377,239 | Germany | June 15, 1923 |